United States Patent
Pliss et al.

(10) Patent No.: US 7,114,045 B1
(45) Date of Patent: Sep. 26, 2006

(54) GARBAGE COLLECTION WITH A DYNAMIC WINDOW

(75) Inventors: Oleg Pliss, Santa Clara, CA (US); Bernd J. Mathiske, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 352 days.

(21) Appl. No.: 10/777,967

(22) Filed: Feb. 12, 2004

Related U.S. Application Data (60) Provisional application No. 60/532,380, filed on Dec. 23, 2003.

(51) Int. Cl.
*G06F 12/00* (2006.01)

(52) U.S. Cl. ...................... 711/159; 711/170

(58) Field of Classification Search ............ 711/154, 711/159, 170; 707/103, 206; 709/315
See application file for complete search history.

(56) References Cited

U.S. PATENT DOCUMENTS

| | | | | |
|---|---|---|---|---|
| 4,797,810 | A * | 1/1989 | McEntee et al. | 707/206 |
| 5,321,834 | A * | 6/1994 | Weiser et al. | 707/206 |
| 5,355,483 | A * | 10/1994 | Serlet | 711/154 |
| 5,687,368 | A * | 11/1997 | Nilsen | 707/103 R |
| 5,848,423 | A * | 12/1998 | Ebrahim et al. | 707/206 |
| 5,857,210 | A * | 1/1999 | Tremblay et al. | 707/206 |
| 6,226,653 | B1 * | 5/2001 | Alpern et al. | 707/206 |
| 6,289,360 | B1 * | 9/2001 | Kolodner et al. | 707/206 |
| 6,308,185 | B1 * | 10/2001 | Grarup et al. | 707/206 |
| 2001/0044856 | A1 * | 11/2001 | Agesen et al. | 709/315 |
| 2002/0116409 | A1 * | 8/2002 | Sokolov et al. | 707/206 |
| 2003/0212719 | A1 * | 11/2003 | Yasuda et al. | 707/206 |

OTHER PUBLICATIONS

Richard Jones, Rafael Lins, "Garbage Collection, Algorithmes for Automatic Dynamic Memory Management", 1996, John Wiley & Sons, pp. 126-131, 143-165.*

* cited by examiner

*Primary Examiner*—Pierre Bataille
*Assistant Examiner*—Paul Schlie
(74) *Attorney, Agent, or Firm*—Park, Vaughan & Fleming LLP (57) ABSTRACT

A system and method for intelligent generational garbage collection using a dynamic window. During normal memory allocation, a sliding window defines a young generation within an older generation or other area of memory. When data are stored that will become garbage within a finite period of time, a temporary phase of operation is initiated. In the temporary allocation phase, the lower bound of the window is fixed, while the upper bound is allowed to expand to accommodate new objects. When the data become garbage, the window is garbage collected and compacted, and normal memory allocation and garbage collection operations resume. Thus, the window is dynamic in both movement and size. When the temporary allocation phase is initiated, the young generation may be garbage collected and compacted, and the lower window bound may be fixed at the location (e.g., address) where the allocation point was when the target data were stored.

32 Claims, 3 Drawing Sheets

GARBAGE COLLECTION WITH A DYNAMIC WINDOW

RELATED APPLICATION

This application claims priority to U.S. Provisional Application Ser. No. 60/532,380, filed on Dec. 23, 2003, which is hereby incorporated by reference.

BACKGROUND

This invention relates to the field of computer systems. More particularly, a system and method are provided for performing garbage collection with a dynamic young generation.

Many generational garbage collection schemes employing multiple generations suffer from over-promotion. That is, they promote too many memory objects from a younger generation to an older generation, or promote objects too frequently. As a result, the older generation must be garbage collected more frequently than it would otherwise.

One reason for over-promotion is that traditional generational garbage collection schemes work in closed environments, without considering or applying externally available information about the objects it handles. For example, garbage collectors generally do not have access to, or do not use, information concerning how likely or how soon a set of data objects will become garbage.

Some generational garbage collection schemes employ a fixed-size window that continually moves across a section of memory. The window defines a younger generation of memory and data objects, while the area behind the moving window defines an older generation and contains data objects promoted from the younger generation because they survived a garbage collection performed on that generation. These schemes also suffer from over-promotion, because the window continually moves, and every object in the younger generation that survives a garbage collection is automatically promoted to the older generation, regardless of how likely or how soon the survivor will become garbage.

SUMMARY

In one embodiment of the invention, a system and methods are provided for performing intelligent generational garbage collection using a dynamic sliding window. During normal memory allocation, a sliding window defines a young generation within an older generation or other area of memory. When data are stored that will become garbage within a finite period of time, a temporary phase of operation is initiated.

In the temporary allocation phase, the lower bound of the window is fixed, while the upper bound is allowed to expand to accommodate new objects. When the data become garbage, or a predetermined period of time passes, the window is garbage collected and compacted, and normal memory allocation and garbage collection operations resume. Thus, the window is dynamic in both movement and size.

When the temporary allocation phase is initiated, the young generation may be garbage collected and compacted, and the lower window bound may be fixed at the location (e.g., address) where the allocation point was when the target data were stored.

In different embodiments of the invention, different events or operations may trigger or end the temporary allocation phase of operation. For example, when a compiler or Java Virtual Machine (JVM) begins to compile a series of instructions, during which a number of short-lived data objects will be used, a garbage collector may be signaled or instructed to start the temporary allocation phase. When compilation is complete, normal operations may be resumed. In other embodiments, the temporary allocation phase may be activated whenever a set of data will become garbage, or is likely to become garbage, within a relatively short period of time.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In an embodiment of the invention, a system and method are provided for intelligent generational garbage collection using a dynamically sized sliding window. Information about the nature of data objects in the memory tended by the garbage collector (e.g., a heap) is used to dynamically adjust the size and/or behavior of the sliding window.

In one implementation of this embodiment, when it is certain (or maybe even just likely) that a relatively large amount of data being used or about to be used will become garbage in a finite or predetermined period of time, the bottom of the window may stop moving, while the top of the window is allowed to expand to accommodate new objects. After the data becomes garbage and the young generation is garbage-collected and possibly compacted, the window may return to its normal size and behavior. Thus, as a result of temporarily sticking or holding the bottom of the window, the system avoids over-promotion and may reduce the frequency with which an older generation of memory needs to be garbage-collected.

In different embodiments of the invention, different events or knowledge may be cause for sticking the window bottom. For example, when an application, method or function is compiled or about to be compiled, the window bottom may be held in place until compilation is complete, particularly if the compilation is known to use or produce a large amount of temporarily data. As another example, when a graph or model is to be computed or generated using a large amount of temporary data, the window bottom may be stuck in place until the data are no longer needed.

Figure 1A:
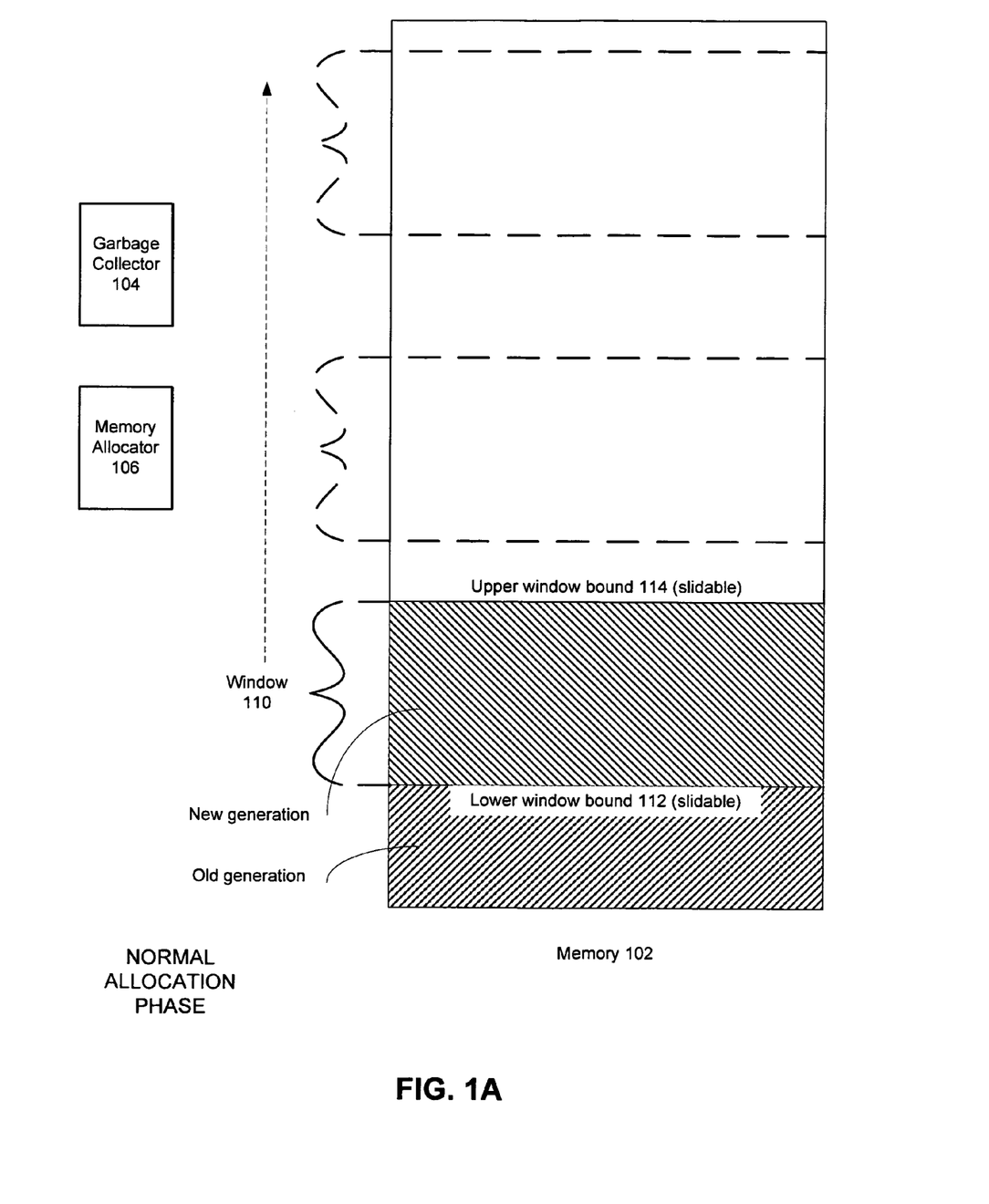
FIG. 1 is a block diagram of a generational garbage collection apparatus that uses a dynamic window for anticipatable garbage, according to one embodiment of the present invention.
Figure 1B:
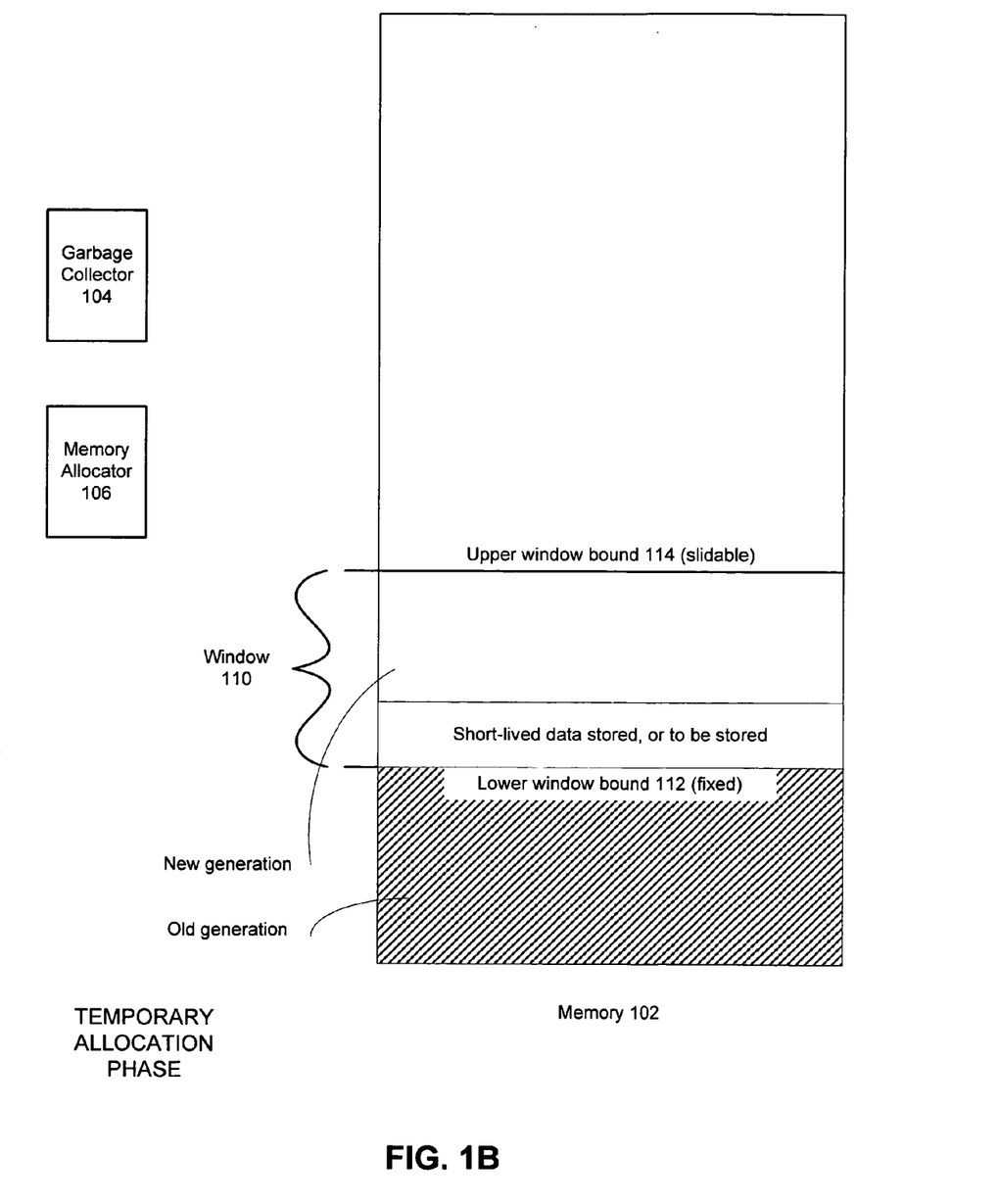

FIG. 1 is a block diagram of a generational garbage collection apparatus that employs a dynamic window and knowledge regarding anticipatable garbage, according to one embodiment of the invention. Although just one young generation and one old generation are depicted in FIG. 1, the illustrated embodiment may be adapted for any number of generations of any sizes. The apparatus may be employed in virtually any device having a processor and memory (e.g., a telephone, a personal digital assistant, a computer).

Memory 102 comprises a section of memory allocated to a heap or other temporary storage pool. Virtually any type of data or memory objects may be stored in memory 102, for virtually any period of time. Garbage collector 104 is configured to perform garbage collection on memory 102 when and as needed. Memory allocator 106 is configured to allocate memory 102 as needed (e.g., for temporary storage of data). Thus, memory allocator 106 may maintain an allocation pointer and/or data structures as needed (not shown in FIG. 1). The functions of garbage collector 104 and memory allocator 106 may be combined.

Window 110 includes lower bound 112 and upper bound 114. When the apparatus of FIG. 1 is initialized, window 110 is positioned with lower bound 112 coinciding with the lower boundary of memory 102.

During one phase of operation of the apparatus (a "normal" allocation phase) window 110 slides upward to form a window over different parts of memory 102. Thus, window 110 defines a young generation of data objects stored in memory 102, while the portion of memory 102 below the window (i.e., between lower bound 112 and the lower bound of memory 102) defines an old generation.

In the first phase of operation, new data or data objects are stored at memory locations at or near the top of window 110. The young generation is garbage collected when the window is filled. Similarly, the old generation is garbage collected when it is filled.

However, a second phase of operation (a "temporary" phase) is initiated upon activation of a particular signal, alert, flag or other notification. For example, the garbage collection apparatus may be signaled by a Java Virtual Machine (JVM), a source code compiler, an interrupt service routine, executing application code or some other set of code. When this signal is received, lower bound 112 of window 110 is held in place at its current location or at another location. For example, the young generation may be garbage collected and then the window moved so that lower bound 112 is at the allocation point as of the time of the signal, and then the lower bound may be held. Or, the lower bound may be moved so that it is positioned near a newly stored set of data.

During this second phase of operation, upper bound 114 may be expanded to accommodate new memory contents, even while lower bound 112 is held in place. Thus, window 110 may grow in size during the second phase of operation.

In an embodiment of the invention, the second phase ends and the first phase of operation resumes when another signal is received or at some other time (e.g., at a certain time, when a timer expires). Illustratively, the young generation may be garbage collected in response to the signal (or some time after the signal), and then the size of the window may be adjusted to a default size or to the size it was before the most recent second phase of operation.

In the illustrated embodiment of the invention, the signal to begin the second phase of operation is issued when the issuer is confident or certain that data or objects that have recently been stored or that are about to be stored will be garbage in a finite and relatively short period of time (e.g., less than one minute). Thus, the first signal (to begin the second phase) may be issued by a JVM or compiler when it begins or is about to begin compiling a method, function or other series of code or compilable instructions. In general, some application or system entity possesses contextual information regarding data being created, and can make a prediction as to how temporary the data are.

The second signal (to end the second phase) is issued when the stored data has become garbage. In the compilation example, the second signal would be issued when compilation is complete.

In other embodiments of the invention, other events or knowledge may cause the first and second signals to be issued. In general, when a relatively large amount of data is to be stored for a finite period of time, the first signal is raised; the second signal follows when the data are no longer needed (i.e., they are garbage).

Thus, in an embodiment of the invention, a young generation window is dynamic in size and behavior. One end of the window (upper or lower, depending on how the window is configured and memory is filled) can be held in position for a period of time while the other end continues to move.

Implementation of an embodiment of the invention helps avoid over-promotion. Because the young generation is held in position for the useful lifetime of a (relatively large) set of data, those data are not promoted to an older generation, and the older generation is garbage collected less frequently. The young generation may also end up being garbage collected less frequently. In particular, when one end of the window is fixed in position and the second phase of operation of the window is implemented, the window may not be garbage collected until the first phase of operation ends.

Figure 2:
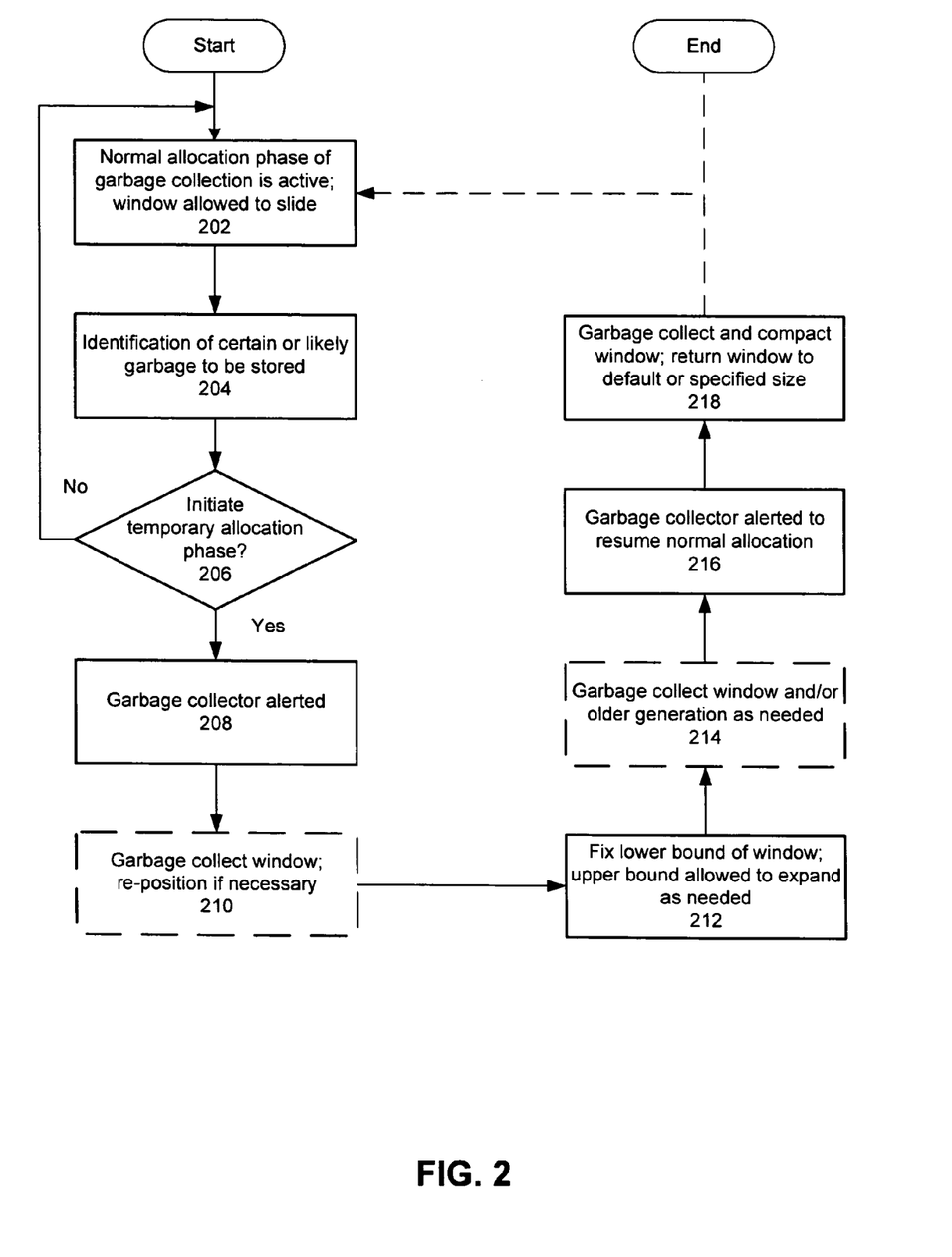
FIG. 2 is a flowchart illustrating one method of performing garbage collection with a dynamic window for anticipatable garbage, according to one embodiment of the present invention.

FIG. 2 is a flowchart demonstrating a method of doing garbage collection with a dynamic window, according to one embodiment of the invention.

In operation 202, the first (or normal allocation) phase of garbage collection is active. That is, a window defining a young generation of memory contents is allowed to slide along a larger, older, generation of memory contents. Either or both generations may be garbage collected as frequently as necessary (e.g., when the window or larger section of memory is filled). When the older generation, or full memory, is garbage collected and compacted, the window may fall to a position just above the compacted contents.

In operation 204, one or more data objects are to be stored in memory. The realization that data are being stored may be made by any set of code or firmware (e.g., part of an application program, a system routine, a BIOS, a JVM).

In operation 206, a determination is made as to whether to initiate the second (or temporary allocation) phase of operation. In this embodiment, this determination entails two examinations—of the amount of data to be stored, and the certainty that the data will become garbage within a finite or predetermined period of time.

The threshold amount of data that must be involved in order to trigger the second phase may be programmable, and may differ among different embodiments of the invention. A single data object may suffice in one embodiment, or an amount of data sufficient to fill a specified percentage of the memory (or young generation window) may be needed. The amount of time before the data will become garbage may be on the order of seconds, minutes or fractions thereof. If the thresholds are met, the method advances to operation 208. Otherwise, the method returns to operation 202.

In operation 208, the garbage collector is signaled or instructed to initiate a temporary allocation phase. The signal may be initiated by the processor or any other entity that possesses the knowledge that temporary data are being stored.

In operation 210, the garbage collector may perform a garbage collection on the young window or an older generation. Then, the young window may be positioned at the location (i.e., address) that the allocation point was at when the signal was received.

In operation 212, one end (e.g., the lower end) of the young window is fixed (i.e., not permitted to slide) and the garbage collector begins the temporary phase of memory allocation. The garbage collector may receive information regarding the amount of data to be stored and/or the amount of time (or an absolute time) after which the data are expected or certain to become garbage.

The window's other end may be made flexible, so that the window can continue to accept new data. The flexible end of the window may expand any number of times, to accommodate virtually any amount of data, during the temporary allocation phase.

In operation 214, garbage collection may be performed on the young and/or old generation as needed.

In operation 216, the garbage collector receives a second signal indicating that it may resume the first phase of operation, thus indicating that data in the young window are (or are expected to be) garbage. This signal may be self-generated (e.g., via a timer), or may be received from the same entity that issued the first signal.

In one alternative embodiment, the garbage collector may automatically halt second phase operations at a specified time or after a specified amount of time of operating in phase two. For example, second phase operations may be stopped after the young window grows to a threshold percentage (e.g., 50%, 100%) of the older generation or the entire memory. In another alternative embodiment, the second phase of operation may be aborted if the young window grows to or past a threshold size.

In operation 218, the young window is garbage collected and compacted, and the size of the window is readjusted to a default size. The position or location of the window may change, depending on how much of the young window survives the garbage collection. Thus, the window may be adjusted to a position just above the compacted survivors of the garbage collection.

After operation 218, the illustrated method returns to operation 202 or ends.

An embodiment of the invention is well suited for implementation in a device with limited memory, such as a telephone. A telephone may have a few or several megabytes of memory, and may employ one-half to one megabyte as temporary storage (e.g., a heap) that is garbage collected.

The telephone may be configured with a JVM to interpret or execute various code (e.g., sounds, games, multimedia applications) that may generate temporary data. For example, a method or function of a program may be compiled by the JVM to speed its execution. The JVM may know that compilation will produce a significant amount of short-lived data. Thus, the JVM may instruct the garbage collection scheme to implement a temporary allocation phase of operation, and may signal for normal allocation to resume when compilation is complete. When temporary allocation is initiated, the young window may be garbage collected and adjusted to have its lower bound at the address where the allocation point was when the signal was received to begin temporary allocation.

This is just one example of how a garbage collection scheme may obtain, or receive information from, outside the garbage collection environment, to increase the efficiency of garbage collection.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM and/or non-volatile (e.g., ROM, disk) memory).

What is claimed is:

1. A method of performing generational garbage collection on a memory using a dynamic slidable window, the method comprising:

receiving an indication that allocated data within the memory should be temporarily inhibited from being promoted from a young generation to an old generation;

identifying a position in said memory at which a set of data expected to become garbage within a finite period of time is to be stored; fixing a lower bound of a slidable window at said position, wherein said window is configured to identify the young generation and said position indicates a boundary between the young generation and the old generation;

allowing an upper bound of said window to dynamically expand while said lower bound is fixed for a period of time exceeding that which it would have remained fixed if said indication had not been received; and after the set of data becomes garbage:
un-fixing said lower bound; and
resuming promotion of allocated data from the young generation to the old generation.

2. The method of claim 1, wherein said receiving comprises:
receiving an alert from an entity configured to have knowledge of a nature of the set of data.

3. The method of claim 1, wherein said receiving comprises:
receiving notification that the set of data is to be stored in said memory.

4. The method of claim 3, wherein said identifying comprises:
identifying a location of an allocation point in said memory at the time said notification is received.

5. The method of claim 1, wherein the size of said window grows as said upper bound dynamically expands.

6. The method of claim 1, further comprising, after the set of data becomes garbage:
garbage-collecting the young generation.

7. The method of claim 1, further comprising, prior to said fixing:
garbage-collecting the young generation.

8. The method of claim 1, further comprising, after the set of data becomes garbage:
decreasing the size of the window to a predetermined size.

9. The method of claim 1, wherein:
during allocation of said memory prior to said fixing:
data are promoted from the young generation to the old generation;
said lower bound and said upper bound are configured to slide simultaneously; and
the window maintains an unchanging size; and
during allocation of said memory after said fixing:
said lower bound does not slide;
said upper bound expands; and
the window dynamically changes size.

10. A computer readable storage medium storing instructions that, when executed by a computer, cause the computer to perform a method of performing generational garbage collection on a memory using a dynamic slidable window, the method comprising:
receiving an indication that allocated data within the memory should be temporarily inhibited from being promoted from a young generation to an old generation;
identifying a position in said memory at which a set of data expected to become garbage within a finite period of time is to be stored;
fixing a lower bound of a slidable window at said position, wherein said window is configured to identify the young generation and said position indicates a boundary between the young generation and the old generation;
allowing an upper bound of said window to dynamically expand while said lower bound is fixed for a period of time exceeding that which it would have remained fixed if said indication had not been received; and
after the set of data becomes garbage:
un-fixing said lower bound; and
resuming promotion of allocated data from the young generation to the old generation.

11. A method of generational garbage collection using a dynamic window, the method comprising:
in a generational garbage-collected memory, defining a young generation with a slidable window having a lower bound and an upper bound;
receiving a first indication that promotion of allocated data from the young generation to an old generation should be temporarily inhibited;
receiving data expected to become garbage in a relatively short period of time;
fixing said lower bound in a position denoting a boundary between the young generation and an old generation for a longer period of time than the boundary would have been fixed if said indication had not been received; and
while said lower bound is fixed in said position:
allowing said upper bound to expand; and
preventing promotion from the young generation to the old generation.

12. The method of claim 11, further comprising, after said relatively short period of time:
garbage-collecting the young generation; and
un-fixing said lower bound.

13. The method of claim 11, further comprising, after said allowing:
receiving a second indication that said data have become garbage.

14. The method of claim 11, further comprising, after said allowing:
observing the passage of a predetermined period of time.

15. The method of claim 11, wherein said allowing comprises:
incrementing said upper bound while said lower bound is fixed in said position.

16. The method of claim 11, wherein said fixing comprises:
identifying a position in the memory at which said data are to be stored; and
setting said lower bound at the identified position.

17. The method of claim 11, wherein said fixing comprises:
identifying a position in the memory where said data are stored; and
setting said lower bound at the identified position.

18. The method of claim 11, wherein said fixing comprises:
determining that said data will be stored in the memory;
wherein said position is the position at which said data are or will be stored.

19. A computer readable storage medium storing instructions that, when executed by a computer, cause the computer to perform a method of generational garbage collection using a dynamic window, the method comprising:
in a generational garbage-collected memory, defining a young generation with a slidable window having a lower bound and an upper bound;
receiving a first indication that promotion of allocated data from the young generation to an old generation should be temporarily inhibited;
receiving data expected to become garbage in a relatively short period of time;
fixing said lower bound in a position denoting a boundary between the young generation and an old generation for a longer period of time than the boundary would have been fixed if said indication had not been received; and
while said lower bound is fixed in said position:
allowing said upper bound to expand; and
preventing promotion from the young generation to the old generation.

20. An apparatus for performing generational garbage collection, comprising:
a memory having an old generation and a young generation;
a slidable window for defining said young generation, said slidable window comprising:
a lower bound configured to be fixed in a selectable position during a temporary phase of allocation of the memory but slidable during a normal phase of allocation of the memory, said position identifying a boundary between said young generation and said old generation; and
an upper bound configured to slide during said temporary phase and said normal phase;
a garbage collector configured to perform garbage collection on one or more of said old generation and said young generation; and
a memory allocator configured to:
allocate the memory in said normal phase when said lower bound and said upper bound slide simultaneously, thereby continuously defining a different portion of the memory as said young generation during said normal phase; and
in response to an indication that promotion of allocated data from said young generation to said old generation should be temporarily inhibited:
fix said lower bound, at a position identifying a boundary between said young generation and said old generation, for longer period of time than said lower bound would remain at said position in said normal phase; and allocate the memory in said temporary phase while continuously increasing the size of the young generation defined by said slidable window during said temporary phase;

wherein during said normal phase data are promoted from said young generation to said old generation; and wherein during said temporary phase promotion of data from said young generation to said old generation is inhibited.

21. The apparatus of claim 20, wherein:

said slidable window maintains an unchanging size while said memory allocator allocates memory in said normal phase; and said slidable window expands in size while said memory allocator allocates memory in said temporary phase.

22. The apparatus of claim 20, wherein said indicator indicates that a set of data is expected to become garbage within a finite period of time.

23. The apparatus of claim 22, wherein said apparatus is configured to un-fix said lower bound and allocate memory in said normal phase after said set of data becomes garbage.

24. The apparatus of claim 22, wherein said selectable position is a position at which the set of data is stored.

25. The apparatus of claim 22, wherein said selectable position is a position at which the set of data will be stored.

26. An electronic device, comprising:

a processor;

a garbage-collectable memory having:
 an old generation of memory; and
 a young generation of memory defined by a slidable window having
a lower bound and an upper bound;

a garbage collector for controlling garbage-collection of said memory;

executable code configured to:
 issue a first indication to said garbage collector when promotion of allocated data from said young generation to said old generation should be temporarily inhibited;
 issue a second indication to said garbage collector when a set of data stored in said memory has become garbage;

wherein, in response to said first indication:
 said lower bound is fixed in a position denoting a boundary between said young generation and said old generation for a longer period of time than said lower bound would have been fixed if said first indication had not been received;
 said upper bound is allowed to expand; and
 promotion of data from said young generation to said old generation is inhibited; and wherein, in response to said second indication:
 said lower bound is un-fixed; and
 promotion of data from said young generation to said old generation is resumed.

27. The electronic device of claim 24, wherein, in response to said second indication, said upper bound is retracted to return said slidable window to its size prior to said first indication.

28. The electronic device of claim 24, wherein, in response to said second indication, said garbage collector garbage-collects said young generation.

29. The electronic device of claim 26, wherein said electronic device is a telephone.

30. The electronic device of claim 26, wherein said electronic device is a computer.

31. The electronic device of claim 26, wherein said executable code comprises a Java Virtual Machine.

32. The electronic device of claim 26, wherein said executable code comprises a compiler.

* * * * *

UNITED STATES PATENT AND TRADEMARK OFFICE
CERTIFICATE OF CORRECTION

PATENT NO. : 7,114,045 B1
APPLICATION NO. : 10/777967
DATED : September 26, 2006
INVENTOR(S) : Oleg Pliss et al.

It is certified that error appears in the above-identified patent and that said Letters Patent is hereby corrected as shown below:

In claim 11 (at column 6, lines 30-36), replace
"identifying a position in said memory at which a set of data expected to become garbage within a finite period of time is to be stored; fixing a lower bound of a slidable window at said position, wherein said window is configured to identify the young generation and said position indicates a boundary between the young generation and the old generation;"

with
--identifying a position in said memory at which a set of data expected to become garbage within a finite period of time is to be stored;
fixing a lower bound of a slidable window at said position, wherein said window is configured to identify the young generation and said position indicates a boundary between the young generation and the old generation;--

In claim 26 (at column 9, lines 34-36), replace
"a young generation of memory defined by a slidable window having a lower bound and an upper bound;"

with
--a young generation of memory defined by a slidable window having a lower bound and an upper bound;--

UNITED STATES PATENT AND TRADEMARK OFFICE
CERTIFICATE OF CORRECTION

PATENT NO. : 7,114,045 B1
APPLICATION NO. : 10/777967
DATED : September 26, 2006
INVENTOR(S) : Oleg Pliss et al.

It is certified that error appears in the above-identified patent and that said Letters Patent is hereby corrected as shown below:

In claim 27 (at column 10, line 22), replace "claim 24" with --claim 26--
In claim 28 (at column 10, line 26), replace "claim 24" with --claim 26--

Signed and Sealed this

Nineteenth Day of December, 2006

JON W. DUDAS
*Director of the United States Patent and Trademark Office*